United States Patent
Wu et al.

(10) Patent No.: US 9,684,519 B2
(45) Date of Patent: Jun. 20, 2017

(54) ELECTRONIC DEVICE USING TRIGGER SIGNAL AND STATUS SIGNAL TO EXECUTE A PLURALITY OF BOOTING MODES

(71) Applicant: ASUSTeK COMPUTER INC., Taipei (TW)

(72) Inventors: Li-Chien Wu, Taipei (TW); Pai-Ching Huang, Taipei (TW)

(73) Assignee: Asustek Computer Inc., Taipei (TW)

(*) Notice: Subject to any disclaimer, the term of this patent is extended or adjusted under 35 U.S.C. 154(b) by 330 days.

(21) Appl. No.: 14/094,085

(22) Filed: Dec. 2, 2013

(65) Prior Publication Data

US 2014/0208093 A1    Jul. 24, 2014

(30) Foreign Application Priority Data

Jan. 21, 2013   (CN) .......................... 2013 1 0021804

(51) Int. Cl.
*G06F 9/44*   (2006.01)

(52) U.S. Cl.
CPC .................................. *G06F 9/441* (2013.01)

(58) Field of Classification Search
None
See application file for complete search history.

(56) References Cited

U.S. PATENT DOCUMENTS

| | | | |
|---|---|---|---|
| 2007/0162735 A1* | 7/2007 | Cho ....................... | G06F 9/4401 713/2 |
| 2007/0162736 A1* | 7/2007 | Wu ........................ | G06F 9/4401 713/2 |
| 2009/0013164 A1* | 1/2009 | Huang ................... | G06F 9/4401 713/2 |
| 2009/0144535 A1* | 6/2009 | Lin ....................... | G06F 11/1417 713/2 |
| 2010/0064128 A1* | 3/2010 | Mendelow ........... | G06F 11/1441 713/100 |
| 2010/0325464 A1* | 12/2010 | Hu ........................ | G06F 1/26 713/330 |
| 2011/0161646 A1* | 6/2011 | Yu ......................... | G06F 9/4401 713/2 |

FOREIGN PATENT DOCUMENTS

| | | |
|---|---|---|
| CN | 101000549 A | 7/2007 |
| TW | 201013534 | 4/2010 |

* cited by examiner

*Primary Examiner* — Kim Huynh
*Assistant Examiner* — Danny Chan
(74) *Attorney, Agent, or Firm* — Muncy, Geissler, Olds & Lowe, P.C.

(57) ABSTRACT

An electronic device with a plurality of booting modes comprises at least a button unit, a control module, a control chip unit, a super I/O unit and a Basic Input/Output System (BIOS). One of the button units outputs a first signal according to a trigger event. The control module includes a buffer unit connected to the button units. The control module sets the buffer unit according to the first signal. The control module outputs a status signal and copies the first signal and outputs the first signal after a delay time. The control chip unit receives the status signal. The super I/O unit receives the first signal outputted from the control module and transmits the first signal to the control chip unit. When the control chip unit receives the status signal and the first signal, the BIOS executes the corresponding booting procedure according to the status signal.

8 Claims, 3 Drawing Sheets

ELECTRONIC DEVICE USING TRIGGER SIGNAL AND STATUS SIGNAL TO EXECUTE A PLURALITY OF BOOTING MODES

CROSS-REFERENCE TO RELATED APPLICATION

This application claims the priority benefit of China application serial No. 201310021804.5, filed on Jan. 21, 2013. The entirety of the above-mentioned patent application is hereby incorporated by reference herein and made a part of specification.

BACKGROUND OF THE INVENTION

Field of the Invention

The invention relates to an electronic device with a plurality of booting modes.

Description of the Related Art

Booting a conventional electronic device usually takes a long time. A long booting time is always unpleasant and results in a poor user experience, especially when a user is in a hurry.

Taking the operating system Windows 8 (WIN8) as an example, the default booting mode is fast-boot. Since the boot speed required by Windows 8 is high, the Basic Input/output System (BIOS) would not scan hardware settings of all electronic components and it only scans some necessary hardware settings for booting, such as graphics and a booting disk. Then, it directly enters the operating system, and the operating system is responsible for loading the drivers for the rest hardware settings, such as a USB interface hardware setting.

However, in the fast-boot mode, a lot of initial settings of some related components on the mainboard may be skipped, such as a mouse, keyboard, or a universal serial bus port, and these components cannot be used normally in the operating system. Once the system has a problem, the user cannot enter the Basic Input/output System (BIOS) to solve the problem, consequently, the same problems in the fast-boot mode occurs repeatedly, and it even cannot enter the operating system.

For example, during the conventional booting process, the power button is triggered first, and then signals are transmitted to the south bridge via the super input/output unit. When the mechanism is imported to WIN8 instant boot system, due to the boot speed is too fast (about 2 seconds), if unknown errors occur, since the device cannot reset the initial value, it will cause the system to fail to boot. If the basic input/output system (BIOS) disables the option of loading the default value at an instant booting mechanism, it has the chance to solve the problem by clearing CMOS (CLRTC) or turning off AC power. If not, the user can't restore the system.

BRIEF SUMMARY OF THE INVENTION

An electronic device is provided. The electronic device includes at least a button unit, a control module, a south bridge unit, a super I/O unit and a Basic Input/Output System (BIOS). One of the button units outputs a first signal according to a trigger event. The control module includes a buffer unit, and it is connected to the button unit. The control module sets the buffer unit according to the first signal, the first signal is stored in the buffer unit, and the control module outputs a status signal. The control module copies the first signal and transmits the first signal after a delay time. The south bridge unit is connected to the control module and the south bridge unit receives the status signal. The super I/O unit is connected to the control module and the south bridge unit. The super I/O unit receives the first signal outputted from the control module and transmits the first signal to the south bridge unit. The BIOS is connected to the south bridge unit. When the south bridge unit receives the status signal and the first signal, the BIOS executes a corresponding booting procedure according to the status signal received by the south bridge unit.

DETAILED DESCRIPTION OF THE EMBODIMENTS

Figure 1:
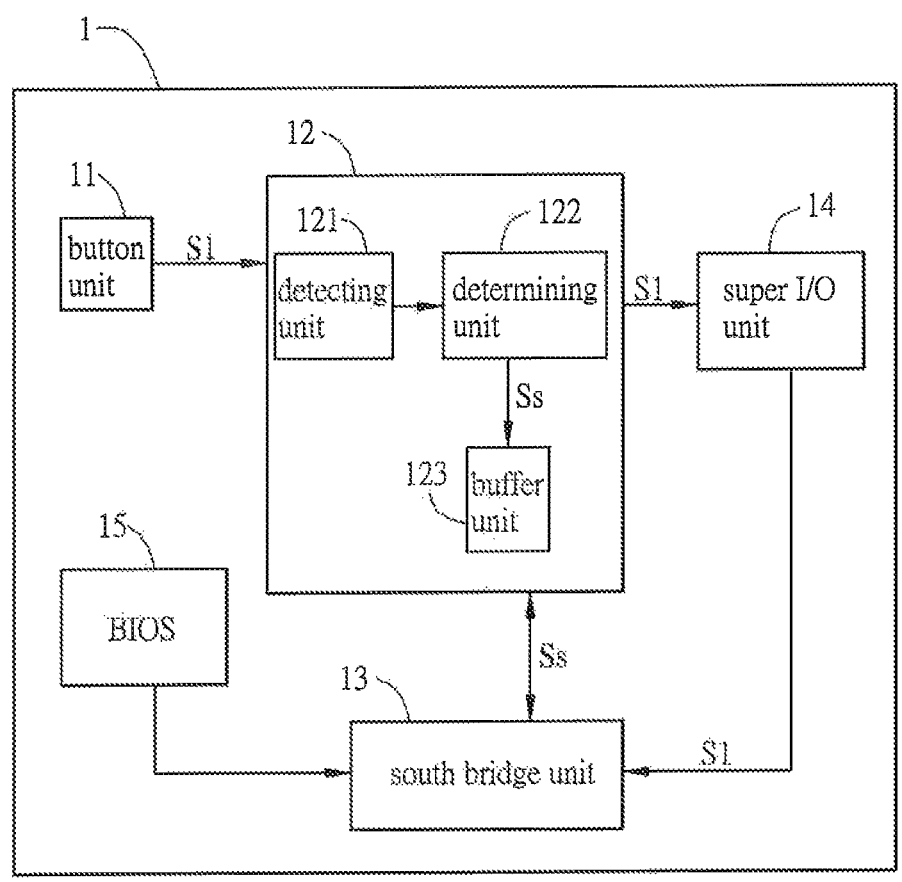
FIG. 1 is a schematic diagram showing an electronic device in an embodiment.

FIG. 1 is a schematic diagram showing an electronic device in an embodiment. The electronic device 1 includes at least one button unit 11, a control module 12, a south bridge unit 13, a super I/O unit 14 and a basic input/output system (BIOS) 15. The electronic device 1 may be a personal computer (PC), a notebook (NB) or a tablet computer. The electronic device 1 may be any electronic devices with an instant booting function, which is not limited herein.

The button unit 11 outputs a first signal S1 according to a trigger event. The button unit 11 maybe a power button, a special button or other button combinations. For example, the electronic device 1 is a personal computer, and the button unit 11 may be a power button of the computer. The button unit 11 also may be an independent button used for setting a booting mode or other special functions.

The trigger event is to press the button unit 11 and generates a first signal S1, the electronic device 1 is controlled to startup or shutdown according to the first signal S1. The first signal S1 represents kinds of signals, and it enables different corresponding events when users press the button unit 11 (for example, if the power button is pressed continuously and exceeds a default time (more than four seconds)), the first signal S1 controls the computer to execute the booting procedure, or the power button is quickly pressed for several times in succession (more than three times), and the first signal S1 controls the computer to execute the instant booting procedure.

The super I/O unit 14 is connected to the control module 12 and the south bridge unit 13. The control module 12 transmits the first signal S1 to the south bridge unit 13 via the super I/O unit. In other words, the function of the super I/O unit 14 is used for transmitting the first signal S1 to the south bridge unit 13 immediately after receiving the first signal S1 from the control module 12. The control module 12 is connected to the button unit 11, and the south bridge unit 13 is connected to the control module 12. The super I/O unit 14 is connected to the control module 12 and the south bridge unit 13. The BIOS 15 is connected to the south bridge unit 13.

When users press the button unit 11 to generate the first signal S1, the first signal S1 is transmitted to the control module 12. The control module 12 controls the electronic device 1 to enable a corresponding startup or shutdown program according to the first signal S1. The control module 12 may act as a buffer to retain the first signal S1 provisionally instead of transmitting the first signal S1 to the super I/O unit 14 directly. The control module 12 copies the first signal S1 and transmits the first signal S1 to the super I/O unit 14 after a delay time. In addition, the control module 12 determines the booting procedure represented by the trigger event (the first signal S1). The buffer unit includes a flag. The determining unit 122 sets the flag of the buffer unit 123 according to content of the first signal S1 after determining the content of the first signal S1, and the content of the flag represents the state of the status signal Ss, and it is used to control the booting procedure.

In detail, when the users provide the trigger event through the button unit 11, the button unit 11 outputs the first signal S1 according to the trigger event. Once the control module 12 detects the first signal S1 output from the button unit 11, it determines the type of the first signal S1. The control module 12 retains the first signal S1 before determining the type of the first signal S1, and then the control module 12 copies the first signal S1 and transmits the first signal S1 after determining the type of the first signal S1. At the same time, the control module 12 stores the determining result in the flag of the buffer unit 123, and the content of the flag represents the state of the status signal Ss.

The function of the control module 12 is used for determining the type of the first signal S1, and the control module 12 copies the first signal S1 and outputs the first signal S1 after the type of the first signal S1 is determined, which can avoid that the electronic device 1 executes the instant booting procedure before the type of the first signal S1 is determined. Especially when the system of the electronic device 1 has errors, it may lead to infinite loop if the instant booting procedure is executed repeatedly, and the problem cannot be found, the electronic device 1 even may be unable to boot normally to backup or do other actions. Furthermore, the control module 12 is an embedded chip integrating the function of detection, determination and temporary storage. The control module 12 includes a detecting unit 121, a determining unit 122 and a buffer unit 123. The detecting unit 121 detects the first signal S1. The determining unit 122 is connected to the detecting unit 121 and outputs the status signal Ss according to the first signal S1. The buffer unit 123 is connected to the determining unit 122 and stores the status signal Ss in the buffer unit.

When the electronic device 1 boots or restarts next time, the BIOS 15 reads the states (the flag) recorded in the buffer unit 123 of the control module 12 and loads the corresponding parameters to the electronic component in the electronic device 1, and it cooperates with the south bridge unit 13 to make the electronic device 1 boot or restart. In addition, after the south bridge unit 13 receives the status signal Ss in the buffer unit 123, the buffer unit 123 is cleared to avoid that two statuses are set true simultaneously.

For example, the trigger event and the corresponding booting procedure or restart procedure may include: (1) when the user continuously presses the button unit 11 exceeding four seconds, the booting procedure is executed; (2) when the user presses the power button exceeding three times in succession, the instant booting procedure is executed; (3) when the user presses an independent button unit, the booting procedure is executed directly.

If the electronic device 1 is in a normal state, when the button unit 11 is pressed directly, the electronic device 1 executes the instant booting procedure; when the electronic device 1 is in an abnormal state, the user can use different trigger events to execute the non-instant booting procedure in the electronic device 1. The instant booting procedure can start the electronic device 1 more quickly than the normal booting procedure, which saves the waiting time.

In another embodiment, the electronic device 1 is in a power on state, when the electronic device 1 is shut down during booting or operating, the user can long press the button unit 11 to restart the computer.

Firstly, when the button unit 11 is pressed, the level of the first signal S1 is changed from high to low. The control module 12 detects the first signal S1, and then retains the first signal S1 and determines the type of the first signal S1. When the control module 12 determines that the corresponding trigger event of the first signal S1 is a four seconds restart event (abnormal power off), the control module 12 sets the flag (which represents executing non-instant booting) as "1" and outputs the status signal Ss to the south bridge unit 13 to inform the south bridge unit 13 to restart the electronic device 1. After a delay time, the control module 12 copies the first signal S1 and outputs the first signal S1. By retaining the first signal S1, the control module 12 has enough time to determine the type of the trigger event. When the super I/O unit 14 receives the first signal S1, the first signal S1 is copied immediately and transmitted to the south bridge unit 13. The south bridge unit 13 restarts the computer when receiving the first signal S1. After the power is restarted, the BIOS 15 reads the buffer unit in the control module 12 and controls the south bridge unit 13 to execute the non-instant booting procedure.

In the embodiment, the control module 12 can detect the first signal S1 and determine the type of the trigger event corresponding to the first signal S1, and then the control module 12 sets the state of the corresponding buffer unit. Before the type of the trigger event is determined, the first signal S1 is not transmitted to the super I/O unit 14 to avoid that the south bridge unit 13 restarts immediately after the first signal S1 is received, which can avoid that the control module 12 has no time to set the state of the buffer unit at "1" and the instant booting procedure is executed next time again, especially when the electronic device 1 has errors, users cannot enter the BIOS 15 to solve the problem.

The time of the long press can be set according to practical requirements. For example, the default time may be 3.8 seconds, which is not limited herein.

In addition, the button unit 11 of the electronic device 1 further includes an independent function button used to execute the normal booting procedure or the instant booting procedure. By defining the trigger event, the control module 12 can determine the instruction represented by the trigger event based on the received first signal S1 (such as pressing the button once, double pressing the button, and long pressing the button for two seconds).

The corresponding booting procedure includes the instant booting procedure, the non-instant booting procedure, entering the BIOS, system recovery program or the combination, which is not limited herein.

Figure 2A:
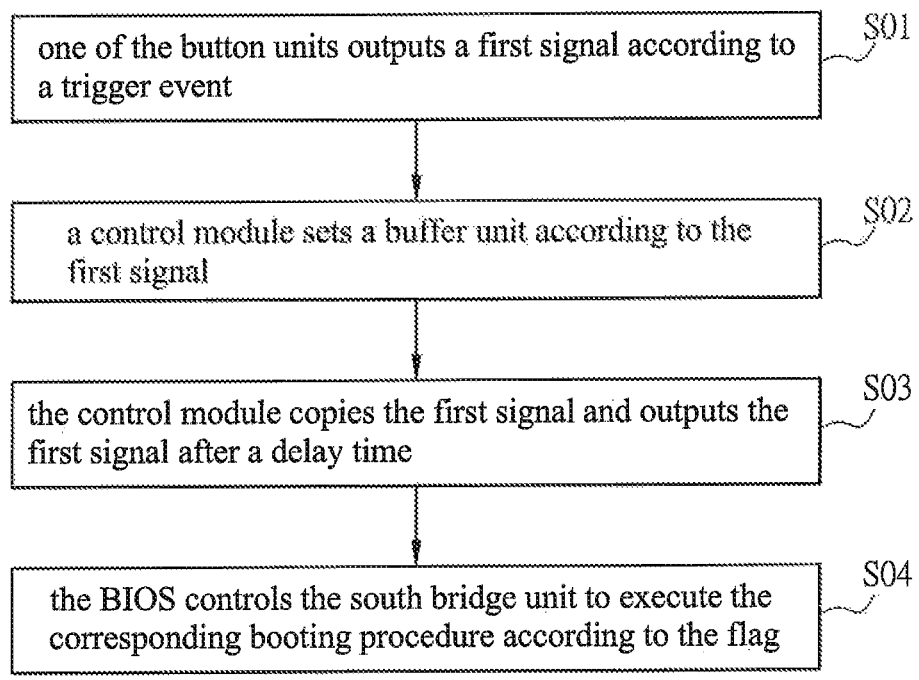
FIG. 2A is a flow chart showing a booting process of an electronic device in a second embodiment.

FIG. 2A is a flow chart showing a booting process of an electronic device in a second embodiment. The booting mode includes the step S01 to step S04.

In step S01, the button unit 11 outputs a first signal S1 according to a trigger event. The button unit 11 may be a power button, a special button or the combinations.

In step S02, the control module 12 sets the buffer unit according to the first signal S1.

In step S03, the control module copies the first signal and outputs the first signal after a delay time.

Furthermore, when the users provide the trigger event through the button unit 11, the button unit 11 outputs the first signal S1 according to the trigger event. Once the control module 12 detects the first signal S1, the control module 12 determines the type of the first signal S1 and sets the buffer unit. The flag represents the booting procedure that will be executed next time. The control module 12 stores the first signal S1 before the type of the first signal S1 is determined, and then the control module 12 copies the first signal S1 and transmits the first signal S1 after the type of the first signal S I is determined. In addition, the control module 12 outputs a status signal Ss.

In step S04, the BIOS controls the south bridge unit 13 to execute the booting procedure according to the buffer unit (the flag). When the trigger event is pressing the button unit 11 exceeding a default time, the trigger event is determined as a non-instant booting event by the determining unit 122, and the south bridge unit 13 executes the non-instant booting procedure. When the trigger event is that pressing the button unit 11 twice in a time interval, the determining unit 122 determines that the trigger event is an instant booting event, and the south bridge unit 13 executes the instant booting procedure.

Figure 2B:
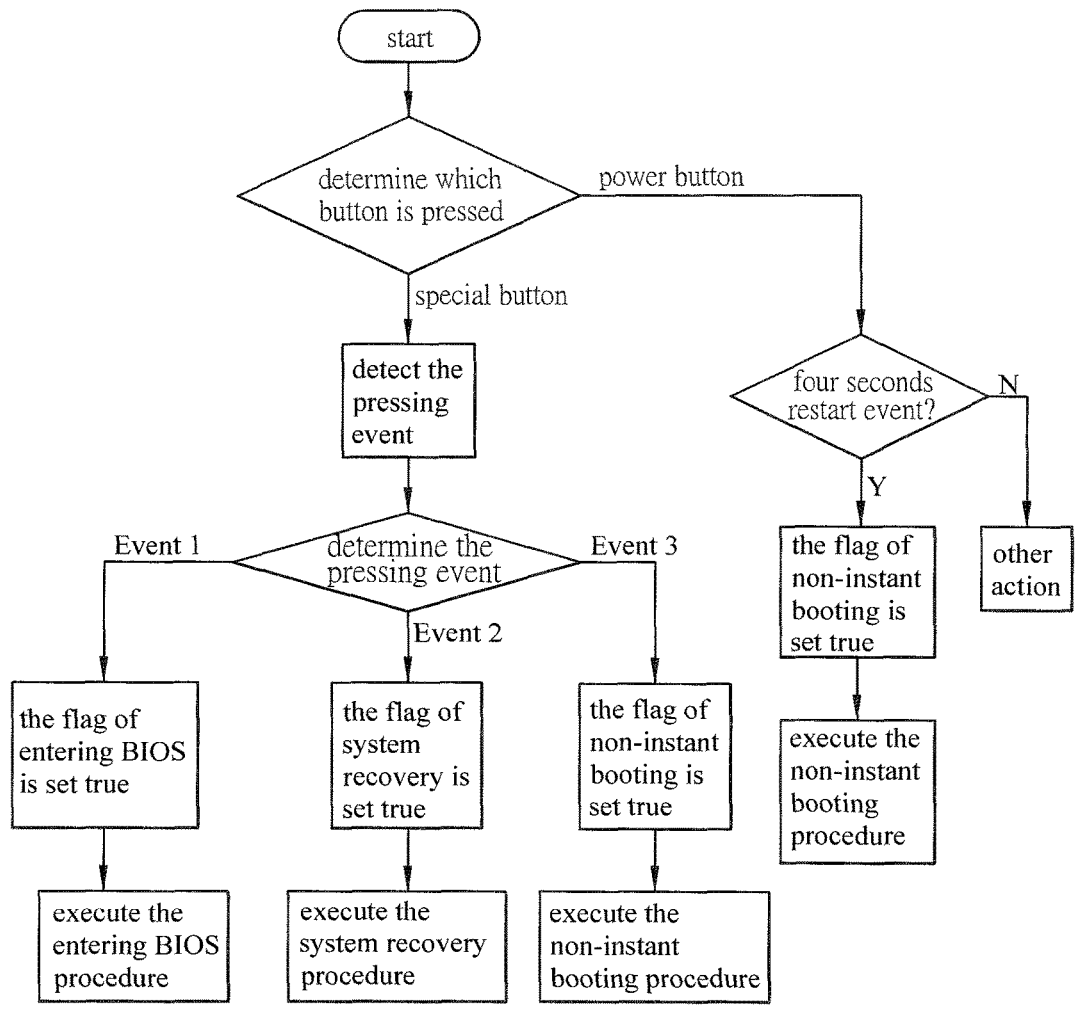
FIG. 2B is a flow chart showing a booting process of an electronic device in a third embodiment.

FIG. 2B is a flow chart showing a booting process of an electronic device in a third embodiment, it further illustrates the flow chart in FIG. 2A.

First, when users press one button unit, the electronic device determines which button unit is pressed, if the power button is pressed, the control module determines whether the trigger event is corresponding to four seconds restart event according to the first signal. If the result is "1", the flag that representing the non-instant booting is set as "1", and it is stored in the buffer unit. If not, execute other actions mentioned previously. The BIOS controls the south bridge unit to execute the non-instant booting procedure. If the special button is pressed, the type of the trigger event is determined according to the first signal, and the corresponding flag (which may represents entering the BIOS or system recovery or the non-instant booting) is set as "1". The BIOS controls the south bridge unit to execute the corresponding booting procedure after reading the flag.

To sum up, according to the electronic device and the booting mode in the embodiments, when the system fails to power on due to an unexpected error, based on one of the above hardware trigger modes, the electronic device 1 executes the default normal booting procedure or the instant booting procedure, and re-initializes the settings of all the components to execute the corresponding normal booting procedure or the instant booting procedure.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device with a plurality of booting modes at least including a first booting mode and a second booting mode, comprising:
   at least a button unit, wherein the button unit outputs a first signal according to a trigger event for choosing one of the first booting mode and the second booting mode;
   a control module, including a buffer unit, wherein the control module is connected to the button unit,
   wherein the control module determines the booting mode represented by the first signal,
   and sets the buffer unit according to the first signal by storing a status signal corresponding to the determined booting mode in the buffer unit, and the control module outputs the status signal, and then the first signal after a delay time;
   a south bridge, connected to the control module and the south bridge receiving the status signal corresponding to the determined booting mode;
   a super input/output (I/O) unit, connected to the control module and the south bridge, wherein the super I/O unit receives the first signal outputted from the control module and transmits the first signal to the south bridge; and
   a basic input/output system (BIOS), connected to the south bridge;
   wherein the south bridge restarts the electronic device when receiving the first signal from the super I/O unit, and after the electronic device is restarted, the BIOS reads the status signal stored in the buffer unit and controls the south bridge to execute a corresponding booting procedure corresponding to the determined booting mode according to the status signal.

2. The electronic device according to claim 1, wherein the buffer unit includes a flag, wherein the control module further includes a detecting unit, a determining unit, and the detecting unit detects the first signal, the determining unit is connected to the detecting unit and sets the flag according to the first signal, and the buffer unit is connected to the determining unit.

3. The electronic device according to claim 2, wherein after the determining unit determines content of the first signal, the flag of the buffer unit is set according to the content of the first signal, and the content of the flag represents a state of the status signal to control the booting procedure.

4. The electronic device according to claim 1, wherein the button unit is a power button or a special button.

5. The electronic device according to claim 1, wherein the corresponding booting procedure includes one or a combination of an instant booting procedure, a non-instant booting procedure, entering BIOS procedure and a system recovery procedure.

6. The electronic device according to claim 2, wherein when the trigger event is that pressing the button unit exceeding a default time, the determining unit determines that the trigger event is a non-instant booting event and the south bridge executes a non-instant booting procedure.

7. The electronic device according to claim 2, wherein when the trigger event is pressing the button unit twice in a time interval, the trigger event is determined as an instant booting event by the determining unit, and the south bridge executes an instant booting procedure.

8. The electronic device according to claim 1, wherein the super I/O unit transmits the first signal to the south bridge immediately after receiving the first signal from the control module.

* * * * *